United States Patent
Das et al.

(10) Patent No.: US 11,513,520 B2
(45) Date of Patent: Nov. 29, 2022

(54) FORMALLY SAFE SYMBOLIC REINFORCEMENT LEARNING ON VISUAL INPUTS

(71) Applicant: INTERNATIONAL BUSINESS MACHINES CORPORATION, Armonk, NY (US)

(72) Inventors: Subhro Das, Cambridge, MA (US); Nathan Fulton, Cambridge, MA (US); Nathan Hunt, Cambridge, MA (US); Trong Nghia Hoang, Cambridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 16/709,633

(22) Filed: Dec. 10, 2019

(65) Prior Publication Data

US 2021/0173395 A1 Jun. 10, 2021

(51) Int. Cl.
   *G05D 1/00* (2006.01)
   *G06N 20/00* (2019.01)
   *G06V 20/10* (2022.01)

(52) U.S. Cl.
   CPC ......... *G05D 1/0088* (2013.01); *G05D 1/0055* (2013.01); *G06N 20/00* (2019.01); *G06V 20/10* (2022.01)

(58) Field of Classification Search
   CPC .... G05D 1/0088; G05D 1/0055; G06N 20/00; G06V 20/10
   See application file for complete search history.

(56) References Cited

U.S. PATENT DOCUMENTS

| 6,917,925 B2 | 7/2005 | Berenji et al. |
| 9,805,423 B1 * | 10/2017 | Konrardy ......... G08G 1/096783 |

(Continued)

FOREIGN PATENT DOCUMENTS

| CN | 104036550 | 9/2014 |
| CN | 107464021 | 12/2017 |

OTHER PUBLICATIONS

Garcia et al., "A comprehensive survey on safe reinforcement learning." Journal of Machine Learning Research 16.1 (2015): 1437-1480.

(Continued)

*Primary Examiner* — Ramsey Refai
(74) *Attorney, Agent, or Firm* — F. Chau & Associates, LLC

(57) ABSTRACT

A method for training control software to reinforce safety constraints using visual inputs includes performing template matching for each object in an image of a reinforcement learning (RL) agent's action space using a visual template for each object wherein each object in the RL agent's action space is detected, mapping each detected object to a set of planar coordinates for each object in the RL agent's action space, determining a set of safe actions for the RL agent by applying a safety specification for the RL agent's action space to the set of variables for coordinates for each object in the RL agent's action space, outputting the set of safe actions to the RL agent for a current state of a RL procedure, and preventing the RL agent from executing an action that is unsafe, before the RL agent takes an action.

20 Claims, 10 Drawing Sheets

(56) References Cited

U.S. PATENT DOCUMENTS

| | | | |
|---|---|---|---|
| 2016/0001775 A1* | 1/2016 | Wilhelm | B60W 30/085 |
| | | | 701/25 |
| 2017/0234689 A1* | 8/2017 | Gibson | B60W 50/14 |
| | | | 701/25 |
| 2018/0005118 A1 | 1/2018 | Kapoor et al. | |
| 2018/0012137 A1* | 1/2018 | Wright | G05B 13/0265 |
| 2018/0098330 A1 | 4/2018 | Nguyen et al. | |
| 2019/0295179 A1 | 9/2019 | Shalev-Shwartz et al. | |
| 2020/0156243 A1* | 5/2020 | Ghare | G06N 20/00 |

OTHER PUBLICATIONS

Abbeel et al., "Exploration and apprenticeship learning in reinforcement learning." Proceedings of the 22nd international conference on Machine learning. ACM, 2005.

Brafman et al., "R-max—a general polynomial time algorithm for near-optimal reinforcement learning." Journal of Machine Learning Research 3.Oct. 2002: 213-231.

Saunders et al. "Trial without error: Towards safe reinforcement learning via human intervention." Proceedings of the 17th International Conference on Autonomous Agents and MuitiAgent Systems. International Foundation for Autonomous Agents and Multiagent Systems, 2018.

Wicker et al., "Feature-Guided Black-Box Safety Testing of Deep Neural Networks," TACAS 2018: Tools and Algorithms for the Construction and Analysis of Systems pp. 408-426.

Xiang et al., "Verification for Machine Learning, Autonomy, and Neural Networks Survey" arXiv: 1810.019891 [cs.AI] (2018).

Lin et al., "Focal Loss for Dense Object Detection," The IEEE International Conference on Computer Vision (ICCV), 2017, pp. 2980-2988.

Platzer, "A Complete Uniform Substitution Calculus for Differential Dynamic Logic," Journal of Automated Reasoning, Aug. 2017, vol. 59, Issue 2, pp. 219-265.

Cheng et al., "QATM: Quality-Aware Template Matching for Deep Learning," The IEEE Conference on Computer Vision and Pattern Recognition (CVPR), 2019, pp. 11553-11562.

Law et al., "CornerNet: Detecting Objects as Paired Keypoints," The European Conference on Computer Vision (ECCV), 2018, pp. 734-750.

Zhou et al., "Objects as Points," Computer Science > Computer Vision and Pattern Recognition, (Submitted on Apr. 16, 2019 (v1), last revised Apr. 25, 2019 (this version, v2), pp. 1-12.

International Search Report dated Mar. 15, 2021 for International Patent Application No. PCT/IB2020/061587.

* cited by examiner

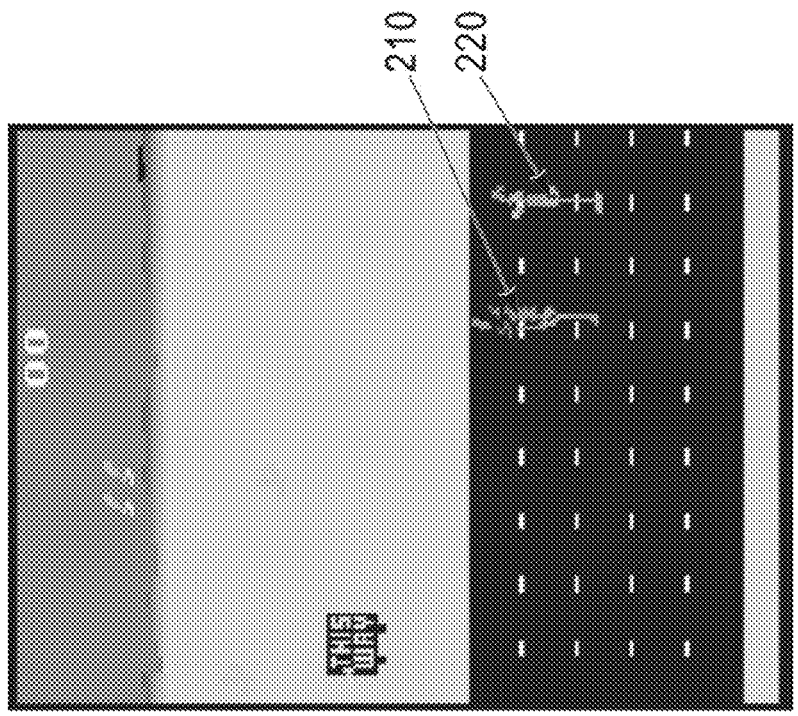
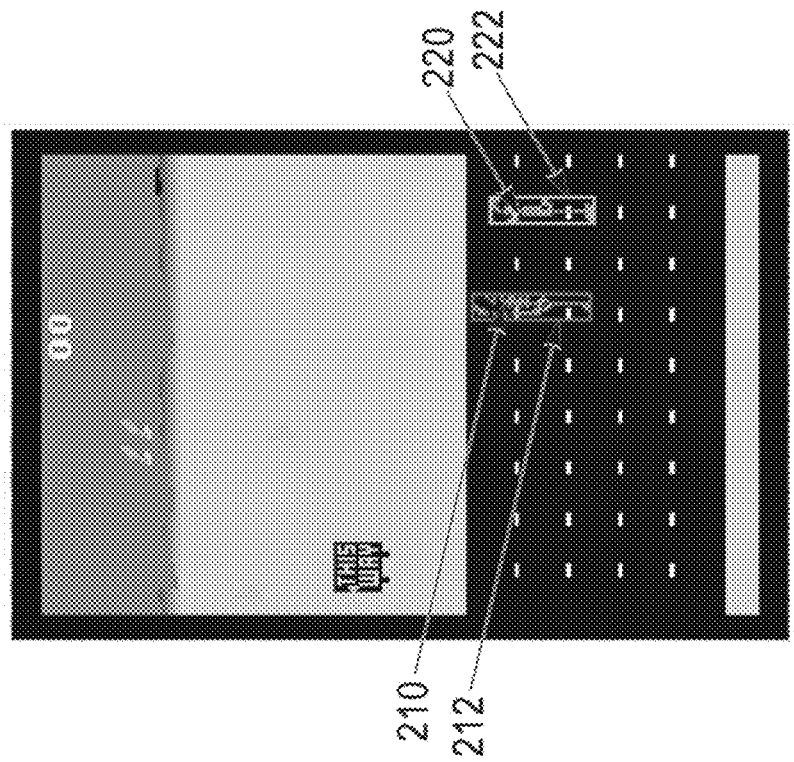
FIG. 2A
FIG. 2B

FORMALLY SAFE SYMBOLIC REINFORCEMENT LEARNING ON VISUAL INPUTS

BACKGROUND

Technical Field

Embodiments of the disclosure are directed to a deep reinforcement learning algorithm that uses visual templates to map visual inputs into a symbolic state space.

Discussion of the Related Art

Control software for physical systems such as self-driving cars and aircraft collision avoidance systems must ensure the highest degree of confidence in safe system operation. Formal verification provides a rigorous method for ensuring the safety of these systems, but typically assumes that the control policy is defined over a symbolic state space; i.e., a mapping from high-level variables to concrete numeric values. For example, a formally verified control policy for an adaptive cruise control system will assume as input the planar coordinates of all relevant vehicles. Although these verified models provide strong safety guarantees, they are typically highly nondeterministic and therefore do not explain how to achieve control objectives.

Reinforcement learning (RL) is a machine learning method in which an agent interacts with its environment to learn to perform tasks. Well-known task examples include games such as Go, Chess, and various computer games. At each state, e.g., current board setup, the agent chooses an action, such as rook to A4. The agent receives a reward for good actions, such as winning the game, or a penalty for bad actions. Over time, the agent learns to act to maximize its reward. Safe RL is a variant of RL in which some actions are restricted to avoid damaging the agent or the environment. In the context of control systems for vehicles, such as automobiles and other land-based motor vehicles, aerial vehicles, boats and underwater vehicles, the RL agent is a representation of the vehicle itself. Safe RL requires a specification of what states and actions are safe.

Previous approaches to safe RL include providing a model, such as a simulator of the environment, and a set of safe states, and simulating each action to check safety. However, this approach is inapplicable if no model is available. Several recent approaches toward safe reinforcement learning explain how to leverage formally verified nondeterministic models of control systems in order to provide safety constraints on reinforcement teaming agents. Many existing approaches toward formally constrained RL assume that the agent is optimizing over a symbolic representation of the world, such as an adaptive cruise control problem in which the positions and velocities of the lead car and follower car are provided as inputs to the control system. Similarly, control policies can be learned over a symbolic state space assuming that relevant state variables are provided as input.

Another approach involves having a human demonstrate safe actions. However, this approach is hard to generalize safely to states on which the human did not demonstrate, and it is hard to improve on the human's performance safely. In another approach, a human supervises agent training, and prevents and punishes unsafe actions. This approach requires significant time from a domain expert, and the learned safety rules are not interpretable.

Unfortunately, real-world systems do not have this type of oracle giving ground truth about the state of the world. Here, an oracle is a (theoretical, not actual) function that always returns the correct answer, but whose implementation is unknown or infeasible. Instead, robots must make decisions in safety-critical settings by processing high-dimensional inputs obtained from sensors such as cameras and LiDAR. Manually mapping every possibly relevant aspect of these visual inputs into a symbolic state space is time-consuming and often intractable. This observation, as well as the effectiveness of deep learning on vision problems, motivated the development of deep reinforcement learning algorithms in which an agent learns a policy directly on visual inputs.

Constrained reinforcement learning (RL) ensures that RL agents only take safe actions by enforcing formally specified constraints on the action space. Existing approaches toward formally constrained RL assume an oracle mapping from raw inputs, such as images, into a symbolic state space. Unfortunately, this assumption does not address the fundamental and difficult task of correctly perceiving the world. Learning over a symbolic state also involves constructing a symbolic state space that captures every aspect of the environment relevant to the reward signal.

Existing approaches toward formally constrained reinforcement learning typically constrain the action space during training, leaving possibly unsafe states completely unexplored during the training process. This raises a concern about generalization: will a trained system remain safe even when there are inaccuracies in the modeling assumptions that were used to construct safety constraints? Aside from some preliminary work suggesting that modeling assumptions can be used to structure the reward signal, this question remains largely unexplored.

Background and related work falls into three broad categories: symbolic reinforcement learning, safe reinforcement learning. with an emphasis on verifiably/formally safe reinforcement learning, and formal specification/verification. Several authors have proposed leveraging symbolic mappings in reinforcement learning. Existing work on symbolic RL attempts to learn a fully symbolic representation of the entire state space. In addition, no prior work on symbolic reinforcement learning accounts for safety constraints of the system being optimized. Safety constraints can be incorporated into symbolic RL via reward structures, but this is insufficient in safety critical scenarios where avoiding catastrophic states is more important that optimizing aggregate reward. Sometimes it is possible to a choose reward structure that ensures the optimal policy will preserve safety constraints, but even in those cases, symbolic reinforcement learning algorithms do not provide safety guarantees during the training process. Other recent work on symbolic RL integrates model based RL and symbolic planning.

Integrating deep neural networks (DNNs) into RL helped scale reinforcement learning to problems that were previously intractable, such as video games and robots that learn control policies directly on camera inputs. Deep RL provides a key advantage over traditional RL approaches which were bottlenecked by a manual, time-consuming, and often incomplete feature engineering process.

Despite these substantial benefits, deep RL algorithms do not provide formal and interpretable safety guarantees based on first principles. This is particularly true during training, where the agent may have to observe a substantial number of catastrophic events before learning to optimize for safety, and even then, only if the reward function is carefully hacked.

SUMMARY

Exemplary embodiments of the present disclosure are directed to a system and method of specifying and enforcing safety constraints so as to generate restricted actions for RL agents to avoid damaging itself/environment. Embodiments of the disclosure take specifications of what states/actions are safe as input from domain experts and does not require any model of the environment. A system according to an embodiment can learn an end-to-end policy and enforces safety constraints by learning a template-based mapping from visual inputs to create a partial symbolic representation of the system's state. Embodiments of the disclosure generalize to complex visual inputs. Empirical evaluations demonstrate that a system according to an embodiment can learn safely and optimize for objectives that are only observable on raw visual inputs. Systems according to embodiments of the disclosure will be of interest to any company that manufactures robotic hardware or software products, such as autonomous vehicles, or provides services to those industry sectors.

According to an embodiment of the disclosure, there is provided a method for training control software to reinforce safety constraints using visual inputs, including performing template matching for each object in an image of a reinforcement learning (RL) agent's action space using a visual template for each object in the image wherein each object in the image of the RL agent's action space is detected, mapping each detected object to a set of planar coordinates for each object in the image of the RL agent's action space, determining a set of safe actions for the RL agent by applying a safety specification for the RL agent's action space to the set of variables for coordinates for each object in the image of the RL agent's action space, outputting the set of safe actions to the RL agent for a current state of a RL procedure, and preventing the RL agent from executing an action that is unsafe, before the RL agent takes an action.

According to a further embodiment of the disclosure, performing template matching for each object in the image of the RL agent's action space comprises using the visual template for each object to place bounding boxes about each object in the image of the RL agent's action space.

According to a further embodiment of the disclosure, mapping each detected object to the set of planar coordinates for each object in the image of the RL agent's action space comprises mapping a centroid of each bounding box to the planar coordinates for each object in the image of the RL agent's action space.

According to a further embodiment of the disclosure, the method includes training template matching for each object by augmenting data in a single, labeled image of the RL agent's action space, removing all templates from the image, randomly sampling a plurality of templates, augmenting each of the plurality of templates, randomly placing each of the plurality of templates in the image using template masks, wherein a plurality of images are created, and training the template matching using the plurality of images.

According to a further embodiment of the disclosure, augmenting data in the single, labeled image includes one or more of randomly adjusting the brightness of the image, cropping the image, or left-right flipping of the image, and augmenting each of the plurality of templates includes one or more of left-right flipping of the template, rotating the template, or dropping pixels from the template.

According to a further embodiment of the disclosure, the RL agent is one of a self-controlled land-based motor vehicle, a self-controlled aerial motor vehicle, a self-controlled floating aquatic motor vehicle, or a self-controlled underwater motor vehicle.

According to a further embodiment of the disclosure, the method includes using differences between the set of planar coordinates for each object at a current RL step and the set of planar coordinates for each object at a previous RL step to infer potential actions of each object. The RL agent uses knowledge of its dynamics and the safety specification to construct constraints that ensure that the RL agent takes an action only if, after taking the action and then following a worst possible outcome of all previously observed state transitions, the safety specification is still satisfied one step into the future.

According to a further embodiment of the disclosure, the safety specification includes a plurality of safety constraints specified in a formal logic for each object in the image.

According to another embodiment of the disclosure, there is provided a method for training control software to reinforce safety constraints in a reinforcement learning (RL) algorithm that runs the control software, including forming visual templates of one or more safety-relevant objects in an input image from sample observations of each said safety-relevant object, determining coordinates for each safety-relevant object from the visual template of each safety-relevant objects in the input image, enforcing safety constraints for a RL agent in the RL algorithm by using the coordinates for each safety-relevant object, and preventing the RL agent from executing an action that is unsafe, before the RL agent takes an action.

According to a further embodiment of the disclosure, determining coordinates for each safety-relevant object from the visual template of each safety-relevant objects in the input image includes placing bounding boxes each safety-relevant object by using the visual template for each object, and mapping a centroid of each bounding box to the coordinates for each safety-relevant object in the input image.

According to a further embodiment of the disclosure, enforcing safety constraints for the RL agent in the RL algorithm includes receiving a safety specification for the RL agent, determining safety constraints from the safety specification and the coordinates for each safety-relevant object, where each action of the RL agent is labeled as safe or unsafe, and preventing the RL agent from executing an action that is unsafe.

According to a further embodiment of the disclosure, the RL agent is one of a self-controlled land-based motor vehicle, a self-controlled aerial motor vehicle, a self-controlled floating aquatic motor vehicle, or a self-controlled underwater motor vehicle.

According to another embodiment of the disclosure, there is provided a non-transitory program storage device readable by a computer, tangibly embodying a program of instructions executed by the computer to perform the method steps for training control software to reinforce safety constraints using visual inputs.

BRIEF DESCRIPTION OF THE DRAWINGS

FIG. 2A shows a roadrunner game environment.

FIG. 2B shows a symbolic mapping of the roadrunner and coyote, according to an embodiment of the disclosure.

DETAILED DESCRIPTION OF EXEMPLARY EMBODIMENTS

Figure 1A:
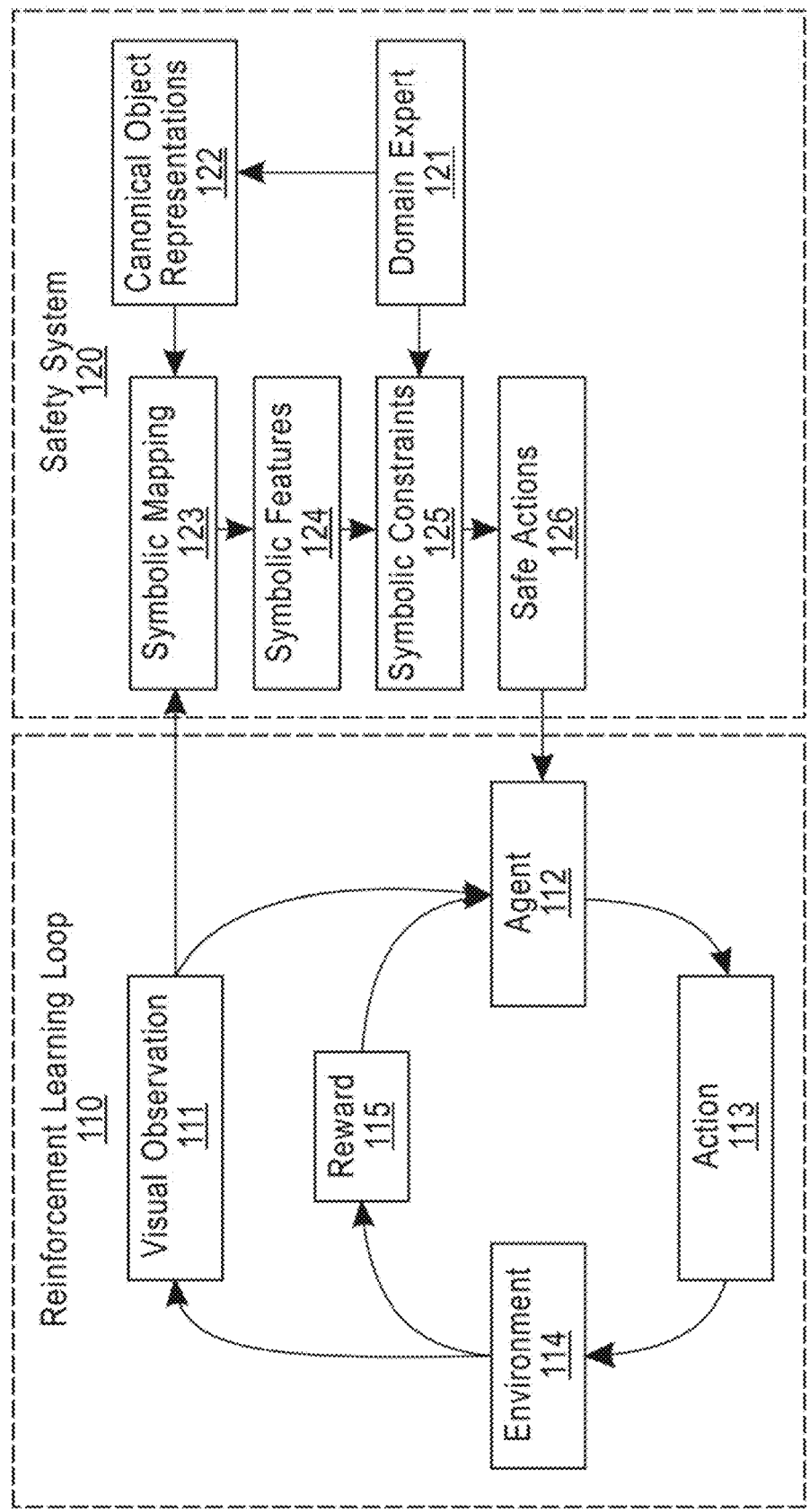
FIG. 1A is a block diagram of a computer vision and reinforcement learning agent system according to an embodiment of the disclosure.

Exemplary embodiments of the disclosure as described herein generally provide a deep reinforcement learning algorithm that uses visual templates to map visual inputs into a symbolic state space. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Exemplary embodiments of the disclosure provide a framework that incorporate symbolic safety constraints into end-to-end reinforcement learning algorithms that learn policies over visual inputs. Embodiments of the disclosure do not assume the existence of an oracle giving a complete symbolic representation of the current state, and do not assume that the agent's policy or value function is defined over a symbolic state space. A system according to an embodiment uses visual template matching to extract safety-relevant symbolic features from visual data, such as positions of an agent and any obstacles the agent should avoid. These symbolic features are then used to enforce formal safety constraints but are not used as the actual domain over which a policy is learned.

Systems according to embodiments of the disclosure provide a system for formally safe end-to-end reinforcement learning on visual inputs that does not rely upon an oracle for mapping from visual inputs into the symbolic state space over which the formal model is defined, and a system for learning guards on actions, such as the set of states in which it is safe to turn left, given a higher-level formal safety specification, i.e., the ultimate safety objective, such as collision avoidance.

Specifying Safety Controllers

According to an embodiment, differential Dynamic Logic (dL) will be used to specify safety constraints on an agent's action space. dL is a logic for specifying and proving reachability properties of both discrete and continuous time dynamical systems. Dynamical systems are specified by hybrid programs (HPs), a simple programming language that combines imperative programs with systems of differential equations. The syntax and informal semantics of HPs are as follows:

$\alpha; \beta$ executes $\alpha$ and then executes $\beta$.

$\alpha \cup \beta$ executes either $\alpha$ or $\beta$ nondeterministically.

$\alpha^*$ repeats a zero or more times nondeterministically.

$x := \theta$ evaluates term $\theta$ and assigns result to x.

$x := *$ assigns an arbitrary real value to x.

$\{x'_1 = \theta_1, \ldots, x'_n = \theta_n \& F\}$ is the continuous evolution of x, along the solution to the system constrained to a domain defined by F.

?F aborts if formula F is not true.

Formulas of dL are generated by the grammar:

$$\phi, \varphi ::= f \sim g | \varphi \wedge \psi | \varphi \vee \psi | \varphi \rightarrow \psi | \forall x, \varphi | \exists x, \varphi | [\alpha] \varphi$$

where f, g are polynomials of real arithmetic, ~ is one of $\{\leq, <, =, >, \geq\}$, and the meaning of $[\alpha]\varphi$ is that $\varphi$ is true in every state that can be reached by executing the program $\alpha$. Formulas of dL can be stated and proven in the KeYmaera X theorem prover. Given such a specification, sets of safe actions, referred to herein as safety monitors, for reinforcement learning algorithms can be constructed over a symbolic state space. According to embodiments, safety constraints are stated in terms of dL primitives but proofs are not constructed for the safety constraints.

Overview

A system and method of specifying and enforcing safety constraints according to an embodiment requires no model of the environment and is applicable in complex (visual) state spaces. A system according to an embodiment allows domain experts to specify high-level safety constraints, maps visual input to high-level features to check constraints, and uses interpretable safety rules. This reduces the time required of a domain expert to specify safety constraints. A system according to an embodiment can prevent an agent from taking an unsafe action. In the context of control software for physical systems, the agent would be an automated self-controlling vehicle, such as a self-driving or robotic motor vehicle, a robotic boat or submarine, or a self-controlling unmanned aerial vehicle.

An example real-world application is robots in an Amazon-style warehouse. Robots need to bring stacks of goods from the warehouse to human packers. Safety constraints would control the allowed locations and speeds of robots, which would be defined separately for other robots, human workers, and stacks of goods.

A computer vision and reinforcement learning agent system according to an embodiment takes as input (1) a high-level (symbolic) safety constraints from a domain expert; (2) canonical object representations; and (3) visual input from the reinforcement-learning environment. A system according to an embodiment does not use a model. A computer vision and reinforcement learning agent system according to an embodiment maps from visual input to symbolic features, checks symbolic constraints, and executes an action in the environment. The output of a computer vision and reinforcement learning agent system according to an embodiment is (1) a set of safe actions in the current state, and (2) a safe control policy.

FIG. 1A is a block diagram of a computer vision and reinforcement learning agent system according to an embodiment. A system according to an embodiment includes a reinforcement learning loop 110 and a safety system 120. The reinforcement learning loop 110 includes visual observations 111, an agent 112, an action 113, an environment 114, and a reward 115. The safety system 120 includes a domain expert 121, object representations 122, symbolic mapping 123, symbolic features 124, symbolic constraints 125, and safe actions 126.

In the reinforcement learning loop 110, at each state, e.g., current board setup, the agent 112 chooses an action 113, such as rook to A4, based on a visual observation 111 of the current environment 114. The action 113 alters the environment 114, and the agent 112 receives a reward 115 for good actions, such as winning the game, or a penalty for bad actions. Over time, the agent learns to act to maximize its reward. In a computer vision and reinforcement learning agent system according to an embodiment, the visual observation 111 are used by the safety system 120 in the symbolic mapping process 123 to determine safe actions 126, which are provided to the agent 112. These will be described in detail below.

According to an embodiment, a domain expert 121 provides symbolic constraints 125 in terms of high-level features, such as objects and their properties, such as a location. The symbolic constraints 125 specify a condition and which actions are unsafe if that condition is met. For example, "Don't move left if a car is nearby on your left and neither above nor below you" can be symbolically represented as $$(0 < agent.x - car.x < 5) \& (abs(agent.y - car.y) < 5): \{left\}.$$

According to an embodiment, the domain expert 121 also provides canonical representations 122 for each object in the system. From an observation 111 the agent could receive, such as an image, the expert 121 notes which objects are where in the image. For example, in ai roadrunner game, shown in FIG. 2A, the agent is the roadrunner 210, and the coyote 220 is an unsafe object. The boxes 212, 222 are the expert annotations.

A system according to an embodiment creates a mapping 123 from the visual inputs 111 to symbolic features 124 using the canonical representations 122 for each object in the system. Pretrained models from other computer vision tasks can be used to avoid the need for much labeled data. Further training on data generated from template images may be performed. A symbolic mapping of the roadrunner 210 and coyote 220 in FIG. 2B yields the following symbolic features: (roadrunner, x=100, y=124), (coyote, x=130, y=129).

A system according to an embodiment evaluates the symbolic constraints 125 on each possible grouping of objects, and allows only those actions 126 which are safe under every constraint 125. For example, given the symbolic features (roadrunner, x=100, y=124), (coyote, x=130, y=129), the symbolic constraints (abs(coyote.y~roadrunner.y)<6) & (0<coyvte.x~roadrunner.x<31): {right}, and set of possible actions {left, right, up, down}, a constraint evaluation according to an embodiment yields the following safe actions 126: {left, up, down}. These safe actions 126 are provided to the agent 112 to select from.

A safety system according to an embodiment is integrated with an RL agent to enforce safety in multiple ways. Safe actions may be selected by a highest safe Q-value, by sampling from a policy distribution over safe actions, or uniformly at random. Penalties for attempts to be unsafe can teach the agent to generalize safety to states accidentally omitted from the constraints. However, strong penalization can lead to overly cautious behavior. There is a trade-off between exploration vs. the rigidity of being safe. The agent's training can either take its original actions, both safe and unsafe, into account, or use the safe actions instead.

A detailed implementation of methods and results according to embodiments is provided below.

Safe RL on Visual Inputs

Embodiments of the disclosure can provide an end-to-end deep reinforcement learning algorithm that uses visual templates to map visual inputs into a symbolic state space that can be used to enforce safety constraints on the agent's action space. The basic framework is illustrated in FIG. 1A, described above. Prior to learning, a domain expert provides a safety specification written in dL or another programming language/logic. A safety specification according to an embodiment is a set of safety constraints. In addition to these symbolic constraints, the domain expert also provides visual templates for each object that is mentioned in the symbolic safety constraints. These canonical object representations are used during teaming to extract symbolic states from visual inputs. A standard end-to-end deep reinforcement learning algorithm is then augmented with a safety monitoring system that maps each visual input into a symbolic feature space, applies the symbolic safety constraints, and outputs the set of safe actions for the current state.

Figure 1B:
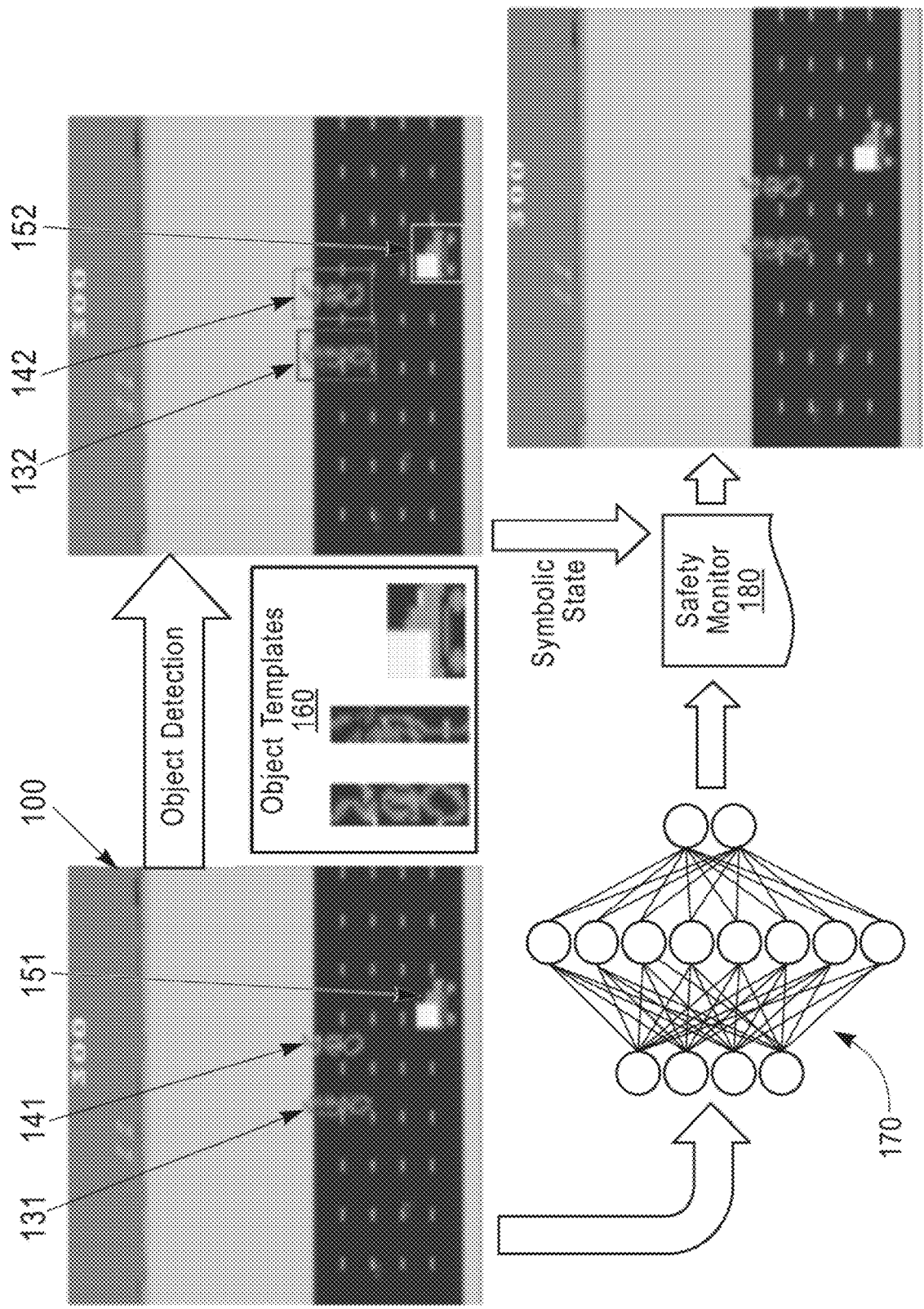
FIG. 1B illustrates an end-to-end deep reinforcement learning algorithm according to an embodiment of the disclosure applied to a road runner computer game environment.

FIG. 1B illustrates an end-to-end deep reinforcement learning algorithm according to an embodiment applied to a road runner environment 100. In FIG. 1B, object templates 160 are used to detect objects in the visual representation 100 of the road runner environment, such as the road runner 131, the coyote 141, and the car 151. The symbolic constraints derived from the detected objects are combined with the output of a policy network 150 acting on the visual representation 100 to learn a safety monitor 180, which is the set of safe actions for the road runner. Note that the symbolic mappings are only used to enforce safety constraints, and the symbolic representation used to enforce safety is not an oracle but is instead learned using a template matching algorithm. In this game, the road runner 131 at position (rr.x, rr.y) must avoid both a coyote 141 at position (co.x, coy) and a car 151 at position (car.x, car.y) while picking up birdseed, which is not represented in the symbolic state. The overall safety specification is collision avoidance for both of these obstacles:

$$(rr.x \neq car.x \lor rr.y \neq car.y) \land (rr.x \neq co.x \lor rr.x \neq co.y) \quad (1)$$

According to an embodiment, template matching is used to place bounding boxes around the road runner 132, coyote 142 (adversarial obstacle), and car 152 (moving obstacle). The centroids of these bounding boxes are then mapped to variables for the x and y coordinates of each object. A symbolic safety constraint defined over these variables is then used to constrain the set of available actions. For example, Listing 1 is one of several constraints for a road runner environment. This constraint states that the roadrunner may not move up or upright (up and to the right) when the car is to the northeast of the roadrunner. Similar constraints on the action for other configurations of the car, roadrunner, and coyote can prevent collisions.

---
Listing 1: An example of a safety constraint for a Road Runner environment.
---
```
a := * ; // choose any action
{
  // disallow up and upright
  // if the car is too close .
  ?(0 < car.x − rr.x < 15 ∧ 0 < rr.y + y_offset − car.y < 30)
  → (a ≠ up ∧ a ≠ upright) ;
};
... // additional constraints
```
---

The constraints in Listing 1 are constructed systematically by a human, i.e., the domain expert, from a combination of the safety specification, in this case, EQ. (1), and an often implicit but preferably explicit model of the environment. According to an embodiment, constraints are inputs on the action space as in Listing 1. According to another embodiment, action constraints such as the one in Listing 1 are constructed by taking as input a safety specification such as Equation (1) and inferring—from some initial experimentation at the beginning of its learning process—how to preserve the safety specification given its observations about how the world behaves. Embodiments of the disclosure can provide a safe RL approach that automatically learns a formal symbolic dynamical model of the environment from visual inputs.

Constructing the Symbolic Mapping

According to embodiments, symbolic safety constraints are stated in terms of planar coordinates of safety-relevant objects, which means that positional safety constraints are supported, not constraints stated in terms of velocity. Most existing approaches toward formally safe RL state safety constraints in terms of positions. Detecting the planar coordinates of each safety-relevant object in the input image requires sample observations of all safety-relevant objects. These sample observations of all safety-relevant objects will form part of the visual template for each object. These sample observations are provided by a human who labels at least one sample observation from the environment with all safety-relevant objects labeled with bounding boxes and segmentation masks. This human is the domain expert mentioned above. The human labels at least one instance of every class of safety-relevant objects, but need not label each instance of that object. For example, there may be multiple cars that enter and leave the scene. The human must label a car, but need not label every single car that enters the scene. Masks are optional but can improve the accuracy of the mapping. For each symbolic object mentioned in the constraints, this canonical visual representation is used to map visual input to a set of planar coordinates of safety-relevant objects. Note that the canonical visual representation of the object is obtained from the visual template of the object, and can be identical to the visual template. It can also be the case that the canonical visual representation is a perturbed version of the visual template. In addition, the labeled images should be sample observations, instead of just cropped images of the safety-relevant objects themselves, so that the background of the labeled image can be used in data augmentation, described below.

According to an embodiment, once the visual templates have been found, the templates and the image can be passed to a template matching function that returns as output the (x, y) coordinate(s) of portions of the image that match a template. According to an embodiment, these (x, y) coordinate(s) correspond to centroids of bounding boxes around objects of interest in the visual templates. An exemplary, non-limiting implementation of a symbolic mapping according to an embodiment is as follows.

---
Algorithm 1: Symbolic Mapping
---
Input: F: feature extractor; I: image; T: templates; $\alpha_T$ : temperatures;
$\tau_T$ : thresholds; $conv_T$ : template-specific convolutional layers

```
1    sym_state ← { }
2    for t ∈ T :
3        scores ← QATM(F; I; t; α_t, conv_t)
4        detections ← [ ]
5        for x ← 1, 2, ..., I.width :
6            for ← y 1, 2, ..., I.height :
7                local_max ← −∞
8                for I ← −1, 0, 1 :
9                    for j ← −1, 0, 1 :
10                       if scores[x+i, y+j] > local_max :
11                           local_max ← scores[x+i, y+j]
12               if scores[x,y] == local_max and scores [x,y] ≥ τ_t :
13                   detections.append([x, y])
14       sym_state[t] ← detections
15   return sym_state
```
---

According to an embodiment of the disclosure, a variation of the Quality Aware Template Matching (QATM) algorithm, disclosed in Cheng e al., "QATM: Quality-aware template matching for deep learning", Proceedings of the IEEE Conference on Computer Vision and Pattern Recognition, 11553-11562 (2019), the contents of which are herein incorporated by reference in their entirety, is used to detect objects in the visual input that match user-provided templates of safety-relevant objects. QATM is an end-to-end differentiable template matching algorithm, meaning that its parameters are trainable. Algorithm 1 gives an overview of a method according to an embodiment for mapping visual inputs to symbolic features. Each step is described in greater detail below. The inputs and output are F: a CNN pretrained on any task with images as input. This is meant to have learned representations that contain relevant features about general images. The template matching is performed in the representation space of this CNN.

I: the image that is being queried for the positions of all objects specified by the templates.

T: the set of template images, one for each object that is to be detected.

$\alpha_T$: a softmax temperature parameter for each template.

$\tau_T$: a threshold for each template; the template matching score should exceed this for a detection to happen (there is another condition as well, described below).

$conv_T$: a separate convolutional layer for each template. The size of the kernel used in each layer matches the size of the corresponding template image. When these are trained, they will make it so the template matching score for each template focuses on the pixel locations that are most discriminatory for that template. A template-specific zero-padding layer is also added so that the score maps for all templates are the same even after convolution with different kernel sizes, but this is omitted for clarity.

sym_state: a dictionary where the keys are the templates and the values are a list of the (x, y) positions of every detected instance of the template object in the image.

A symbolic mapping according to an embodiment includes three sections: the QATM algorithm (line 3 above, including modifications; detecting objects from the QATM scores (lines 4-13 above); and training the model.

QATM

The feature extractor F can be any pretrained CNN. The template matching will be done using the learned representations of the CNN instead of in the raw pixel space. Because the template matching task may differ from the original task the feature extractor was trained for, the extracted features are taken from layers that are not near the output layer of the network. According to an embodiment, the same setup as in the original QATM paper is used: the feature extractor is a deep convolutional neural network pretrained on an image database, and the features from the second and sixteenth layers are used. A bilinear interpolation is used to resize the features from the sixteenth layer, after more pooling has occurred, to be the same size as those from the second layer. The feature maps from both these layers are then concatenated to produce the final feature tensor. The images I passed to the symbolic mapping are the full-resolution RGB observations from the environment. Although lower-resolution grayscale images are used as inputs to PPO for efficiency, a symbolic mapping according to an embodiment is more accurate with the raw observations. Because of how critical preserving safety is, this is worth the decrease in efficiency, which mainly matters for training. An algorithm according to an embodiment can still process more than 100 frames per second, which is sufficient for real-time inference. The templates T used by the symbolic mapping are cropped from the expert-annotated image using the given bounding box. If a segmentation mask is provided, those pixels that do not belong to the object can be set to a background value. Zero is used for a roadrunner environment, but no changes are made to the templates in the XO environment because the objects themselves have pixel values of 0. The template-specific temperature $\alpha_T$, threshold $\tau_T$, and convolutional layers $conv_T$ will be discussed below.

According to an embodiment, a trainable convolutional layer was added to the feature extractor of QATM, after concatenating the feature maps from the two layers, and separate smoothing layers and softmax temperatures were trained for each template. For full details on how the QATM function works, see Chen& et al. Briefly, Cheng's method first computes features for the image and template using the feature extractor. The similarity between these features at each location is computed using a tensor product over the channel dimension. Two softmax arrays are then computed using the given temperature: one over the dimensions of the template and one over the dimensions of the image. These are multiplied element-wise and a max is taken over the dimensions of the template to get the QATM score, which is a predicted matching probability, at each location.

Detecting Objects from Score Maps

According to an embodiment, to get detections from the score maps, all locations with greater scores than their neighbors and that reach a template-specific threshold are selected. Detecting the locations that have local maximum scores can be done by checking whether the score at a location is equal to the result of a maxpool operation centered at that location. This is an efficient method due to optimized GPU implementations available for the maxpool operation. Any location where the score is equal to the result of a maxpool with a 3×3 kernel applied at that location and where the score exceeds the threshold for that type of object is returned as a detection. This computation is done explicitly with for loops for clarity in lines 2-11 of Algorithm 1.

According to an embodiment, Algorithm 1 is run for each template to get the detected locations of all objects, though in practice some of the computations can be reused between calls with the same input image. These object types and locations are the symbolic features that will be used to evaluate the safety constraints at the current state as shown below.

Training the Symbolic Mapping

Figure 2D:
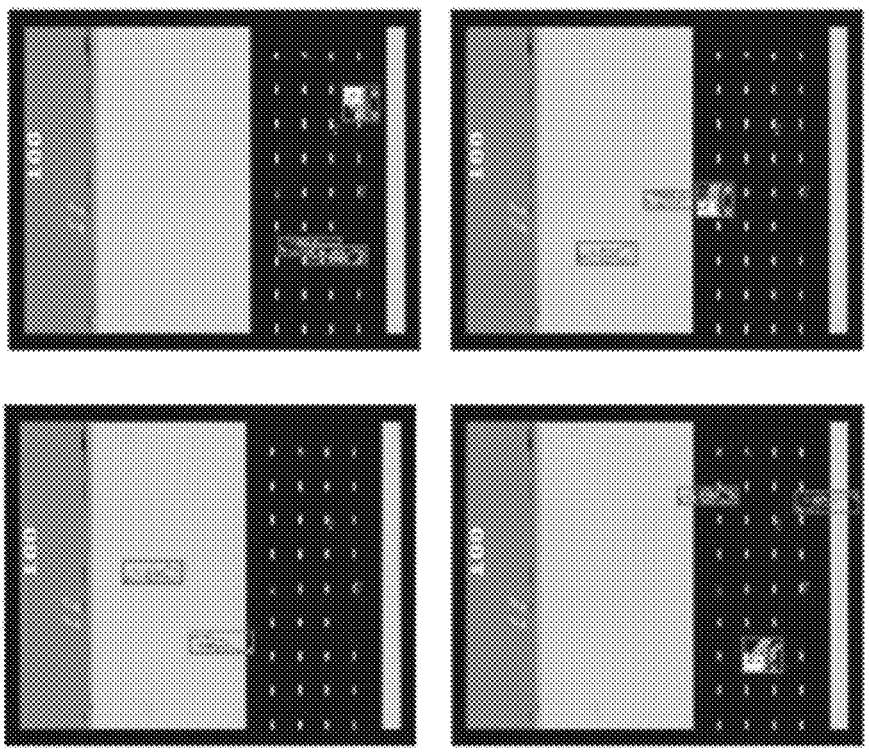
FIG. 2D shows an exemplary set of training images, according to an embodiment of the disclosure.
Figure 2C:
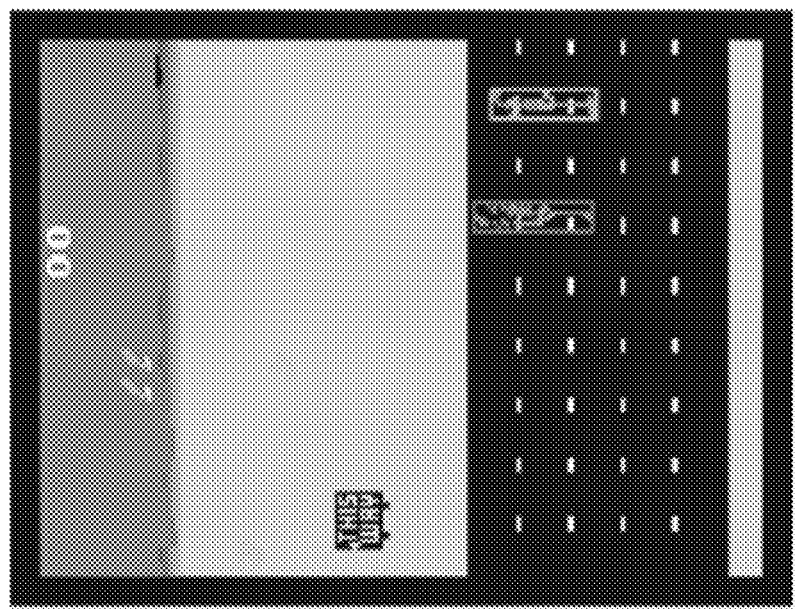
FIG. 2C shows a single labeled template image, according to an embodiment of the disclosure.

According to an embodiment, to avoid introducing a dependency on heavy annotations, a single labeled template image, as shown in FIG. 2C, was used to train QATM, and aggressive data augmentation was used to train the symbolic mapping's parameters. Example augmentations include random adjustments to brightness of the image, crops, and left-right flips. In addition, template masks were used to move the templates to different locations in the background image. Initially, all templates were removed from the image by using an inpainting algorithm to replace their pixels. Then, to create each image used for training, a set of templates was randomly sampled to include in the image. For each template, left-right flipping, small rotations, and dropping some of the template pixels were randomly applied. The template was then pasted onto a random location in the background image, to create a set of many training images. FIG. 2D shows an exemplary set of training images, according to an embodiment of the disclosure. Because of the graphical simplicity of these environments, the average color of the template is sufficiently different from the average color of the pasting region. This ensures that the template will be distinguishable.

Moving objects often partially occlude one another. To ensure a symbolic mapping can perform the task of identifying partially occluded objects, a high probability of template overlaps is used in the augmentation. This is relevant in a road runner environment for two reasons. First, it is acceptable for the car to hit the coyote. Second, the roadrunner can overlap the car without colliding with it. Similar partial overlap situations occur in other control problems, such as when two pedestrians pass one another in front of a car.

---

Algorithm 2: Label Score Map Creation

---

Input: xs: list of center x positions for each object of a type;
    ys: list of center y positions for each object of a type;
    h: desired height of the label image;
    w: desired width of the label image;
1 label ← $0_{w \times h}$ // an array of zeros of size w × h
2 $\Sigma \leftarrow \begin{bmatrix} w/2 & 0 \\ 0 & h/2 \end{bmatrix}$;
3 for x ∈ xs :
4   for y ∈ ys :
5     μ ← [x; y]
6     for i ← 1, 2, . . . , w :
7       for j ← 1, 2, . . . , h :
        // $\phi_{\mu,\Sigma}$ returns the probability density of a multivariate Guassian parameterized by μ and Σ
8         label [i, j] max(label[i, j], $\phi_{\mu,\Sigma}$ ([i, j]));
9 return label According to an embodiment, after creating an augmented dataset, template matching is trained using backpropagation by using a small number of labeled examples for the single, labeled template image. An exemplary, non-limiting procedure for creating a label score map is Algorithm 2, above. If the true location of an object is at pixel location (x, y) then a 2D Gaussian distribution with mean [x; y] is created and its probability density is evaluated at each pixel location (I, j) to get the label image. Note that this is not normalized to sum to 1 across the entire image. The covariance of the Gaussian is set to [w=2, h=2] along the diagonal and 0 elsewhere where (w, h) are the width and height of the given template; this means that the larger a template object is, the less slight errors are penalized in a predicted object location. If there are multiple instances of the same object in an image, a single label image is created by taking the element-wise maximum of the label image created for each object of the same type. The loss function between this label score map and the predicted score map is a focal loss: a variant of cross-entropy that focuses more on difficult examples, where the predicted probabilities are farther from the true probabilities. According to an embodiment, a modified focal loss is used:

$$L = -\frac{1}{N+1} \sum_{x=1}^{w} \sum_{y=1}^{h} \sum_{t=1}^{T} \begin{cases} (1-\hat{Y}_{xyt})^\alpha \log(\hat{Y}_{xyt}) & \text{if } Y_{xyt} = 1 \\ (1-Y_{xyt})^\beta \hat{Y}_{xyt}^\alpha \log(1-\hat{Y}_{xyt}) & \text{otherwise} \end{cases},$$

where N is the number of objects in the image, of any type; (w, h) are the width and height of the image, respectively; and T is the number of templates, which corresponds to the number of different types of objects. $\hat{Y}_{xyt}$ is the predicted probability of an object matching template t being centered at position (x y) in the image, i.e., the score map from QATM, and $Y_{xyt}$ is the "true" probability generated using Algorithm 2. α, β are hyperparameters. According to an embodiment, these are set to 2 and 4, respectively. N+1 is used instead of the usual N when averaging over objects to avoid divide by 0 errors because we some images are created with no objects present.

All training of the symbolic mapping occurs prior to use by an RL agent so that safety can be enforced throughout RL training.

Enforcing Constraints

A system according to an embodiment of the disclosure can augment any existing deep reinforcement learning algorithm, the only modification being that before any action is taken, a safety monitor first extracts the symbolic features from the visual input using a template-based method according to an embodiment. According to an embodiment, the safety constraints are evaluated, each of which maps the symbolic state to a set of permitted actions. To prevent unsafe actions from being executed, the probability of all unsafe actions over the action space is set to zero and the distribution renormalized before an action is sampled from the policy. For example, if the action space is {left, right, up, down} then Prob(left)+Prob(right)+Prob(up)+Prov(down)=1. However, if the action left is unsafe, then the agent may only choose between {right, up, down} and Prov(left) is set to 0. In that case, the Prob(left) is uniformly redistributed to all of the other options, so that Prob(right)+Prob(up)+Prov(down)=1.

Pseudo-code for a safe end-to-end reinforcement learning algorithm for visual inputs is below.

Listing 2: Safe End-To-End Reinforcement Learning for Visual Inputs

```
Input: init: an initial state;
    (S, A, R, E): an image space, action space, reward function, and
transition function, respectively;
    choose(x): a function that chooses an element from the set X;
    update: a function that updates a model based on observed reward;
    done: terminal conditions for the network;
    CM: a controller monitor that monitors control conditions;
    symmap: the symolic mapping obtained using Algorithm 1;
{
    prev := curr := init;
    a0 := NOP
    while (!done (curr)) {
        symbState := 0;
        for (( obj, x, y) in symmap (curr)) {
            symbState ['obj.x'] = x ;
            symbState ['obj.y'] = y ;
        }
        u := choose({a ∈ A | CM(a, symbState)});
        prev := curr;
        curr := E( u, prev);
        update(prev, u, curr);
    }
}
```

According to an embodiment, since S ranges over images, not symbolic states, at each step, a symbolic state is constructed over which the controller monitor is defined. The symbolic state symbState is obtained from symmap and is used to instantiate symbolic variables in the controller monitor.

Learning Action Constraints from Safety Specifications

A framework according to an embodiment can ensure that an RL agent respects a safety constraint, such as collision avoidance, by evaluating state-dependent constraints on the action space, such as do not go down if the car is just below you. In approaches toward formally safe RL, these state-dependent constraints are constructed by a domain expert by taking into account both an approximate model of the environment and the desired safety specification. Constructing these state-dependent constraints on the action space is both time-consuming and error-prone. A system according to another embodiment can learn the dynamics of the safety-relevant objects and automatically construct the constraints on the action space required to respect a high-level safety specification. Because this is done in a symbolic space, the dynamics are easier to learn than in the visual space.

According to another embodiment, a teach step, differences between the current and previous symbolic features of each object are used to infer the potential actions of that object. For an agent with actions {left, right, up, down}, these differences are mapped to the action that was executed; each action is taken once at the beginning of the training of the RL algorithm to provide initial knowledge about the agent's dynamics. By using a one-step look ahead, the agent can use these dynamics and a safety specification to construct constraints that ensure that it only takes an action if, after taking the action and then following the worst possible outcome of all previously observed state transitions, the safety specification is still satisfied one step into the future.

Listing 3: Learning Action Constraints from Safety Specifications

```
state2symb (s, symmap) {
    symbState := 0;
    for ((obj, x, y) in symmap (s)) {
        symbState ['obj.x'] = x;
        symbState ['obj.y'] = y;
    }
    return symbState;
}
learnBehavior(init, A, E, symmap) {
    foreach(object obj that symmap recognizes) {
        maxXOffset[obj] := maxYOffset[obj] := 0 ;
    }
    //self is the name of the agent (e.g., rr in the roadrunner
    env.) foreach (a in A) {
        maxXoffset[self, a] := maxYOffset[self, a] := 0 ;
    }
    prev := curr := init;
    repeat (K times ) {
        for (a in A) {
            prev := curr:
            curr := E( a, prev);
            prevSymb := state2symb( prev, symmap);
            currSymb := state2symb( curr, symmap);
            foreach( object obj that symmap recognizes) {
                // Note: if obj is the agent, store a separate
                offset for each action
                maxXOffset[obj] := max(
                    abs(currSymb['obj.x'] -
                    prevSymb['obj.x']),
                    maxXOffset [obj]
                );
                maxYOffset[obj] := max(
                    abs(currSymb['obj.y'] -
                    prevSymb['obj.y']),
                    maxYOffset [obj]
                );
            }
        }
    }
    return max offsets for each object and for self.
}
LearnActionConstraints(init, (S,A,R,E), choose, update, done,
symmap) {
    CM := constructCM (learnBehavior (init, A, E, symmap);
    prev := curr := init;
    a0 := NOP ;
    while (!done (curr)) {
        symbState := 0;
        for ((obj, x, y) in symmap(curr)) {
            symbState['obj.x'] = x ;
            symbState['obj.y'] = y ;
        }
        u := choose ({a ∈ A | CM(a, symbState)}) ;
        prev := curr;
        curr :==E(u, prev);
        upstate (prev, u, curr);
    }
}
```

The learnBehavior function constructs a guard on each action by performing a worst-case one-step look-ahead for each object. For example, according to another embodiment, consider an agent that observes taking action "right" can result in a change to its own x coordinate of between 1 and 5 pixels. The agent also observes an obstacle that always moves 2 pixels left. In this case, a safety constraint can be constructed that states that if the obstacle is to the right of the agent then the agent may only move right if the agent is more than 7 pixels away from the obstacle.

A system according to another embodiment does not guarantee constructing a safe policy; it may fail to do so in domains where myopic one-step safety is insufficient to ensure global safety. However, an approach according to another embodiment requires far less human effort, is sufficient in certain types of domains, and can be extended by constructing constraints that plan multiple steps ahead.

EXPERIMENTAL EVALUATION

Systems according to embodiments of the disclosure were evaluated on two environments: a toy "Xs and Os" (XO) environment and a computer game implementation of a road runner environment. According to an embodiment, three criteria were used for evaluation: preservation of safety constraints; generalization to environments that slightly deviate from the original environment, as well as internalization of safety constraints into the control policy via penalization; and optimization of objectives other than maintaining safety—in this case, optimizing the environmental reward.

Descriptions of Evaluation Environments

The XO environment is a simple setting introduced to demonstrate symbolic reinforcement learning algorithms. The XO environment, visualized in FIG. 3G, contains three types of objects: X objects that must be collected (+1 reward); O objects that must be avoided (−1 reward); and the agent (marked by a +). There is also a small penalty (−0.01) at each step to encourage rapid collection of all Xs and completion of the episode. This environment provides a simple baseline for evaluating deep reinforcement learning algorithms according to embodiments of the disclosure. It is also simple to modify and extend, which can be used to evaluate the ability of systems according to embodiments to generalize safe policies to environments that deviate slightly from implicit modeling assumptions. The symbolic state space includes the + and Os but not the Xs because they are not safety-relevant. For efficiency, a simpler template matcher was used for this environment.

In addition to the XO environment, the road runner game was considered as an exemplar of arcade-style games in which end-to-end reinforcement learning algorithms have proven particularly effective. In this game, visualized in FIG. 1B, the road runner 110 must avoid a coyote 120 as well as a car 130 while also collecting birdseed from the ground. A symbolic state space according to an embodiment includes a coyote, a car, and a road runner but not the birdseed. Only the first level of this environment is considered, and end episodes when level two is reached, where level refers to levels in the video game. Though grayscale images are used as inputs to the RL agent, as is common, full RGB images are used for the symbolic mapping.

Preservation of Safety Constraints

Preserving desired safety specifications is a goal of a system according to an embodiment. A system according to an embodiment can preserve safety specifications, even when there is some noise in the visual→symbolic mapping. Preserving safety specifications also substantially improves policy performance early in the training process.

Figure 3A:
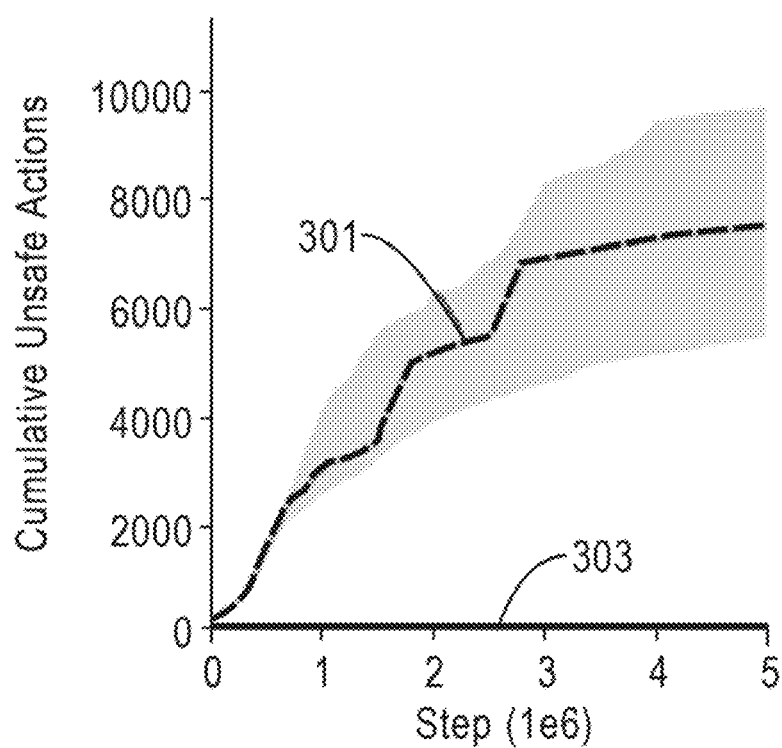
FIG. 3A compares the number of safety violations during training in the XO environment, according to an embodiment of the disclosure.
Figure 3B:
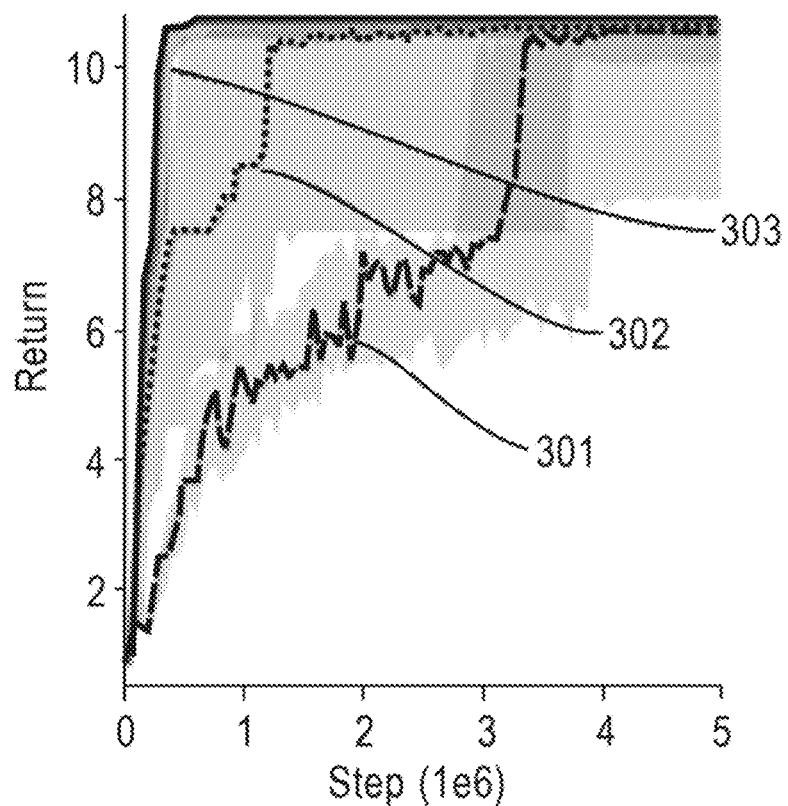
FIG. 3B illustrates a cumulative reward during training in the XO environment, according to an embodiment of the disclosure.

A system according to an embodiment can perfectly preserve safety throughout training in the XO environment because the visual→symbolic mapping can be performed perfectly. FIG. 3A shows that a system according to another embodiment 303 preserves safety throughout training while a vanilla proximal policy optimization (PPO) 301 does not even converge to a policy that entirely avoids unsafe objects by the end of training.

Preserving safety in the road runner environment is more challenging because there is some noise in the visual→symbolic mapping. Despite a noisy mapping, a system according to an embodiment 302 can preserve safety in the vast majority of training episodes, significantly more than a PPO 301, as FIG. 3D shows.

Generalization and Internalization

A concern often expressed about constrained RL is that pruning out unsafe portions of state-action space during training will result in brittle policies that do not internalize the negative reward associated with bad states. Hypothetically, this means that the resulting constrained policies fail to generalize to slight deviations in modeling assumptions. One way of addressing this concern is to force an RL agent to internalize potential negative rewards without actually taking restricted actions.

This penalization hypothesis is tested by modifying a system according to an embodiment in the following manner. Instead of providing a restricted action space to an agent, instead: (1) allow the agent to choose any action; (2) penalize the agent for selecting an unsafe action; but (3) still replace unsafe actions with known-safe actions. In this way, the agent is penalized for selecting unsafe actions without actually compromising safety during the training process. A working hypothesis is that this embodiment with penalization would allow the agent's policy to internalize knowledge provided by the safety constraints without having to actually take those actions and directly observe unsafe states. However, experiments in the XO environment reveal that penalization often degrades performance on every relevant metric.

Figure 3C:
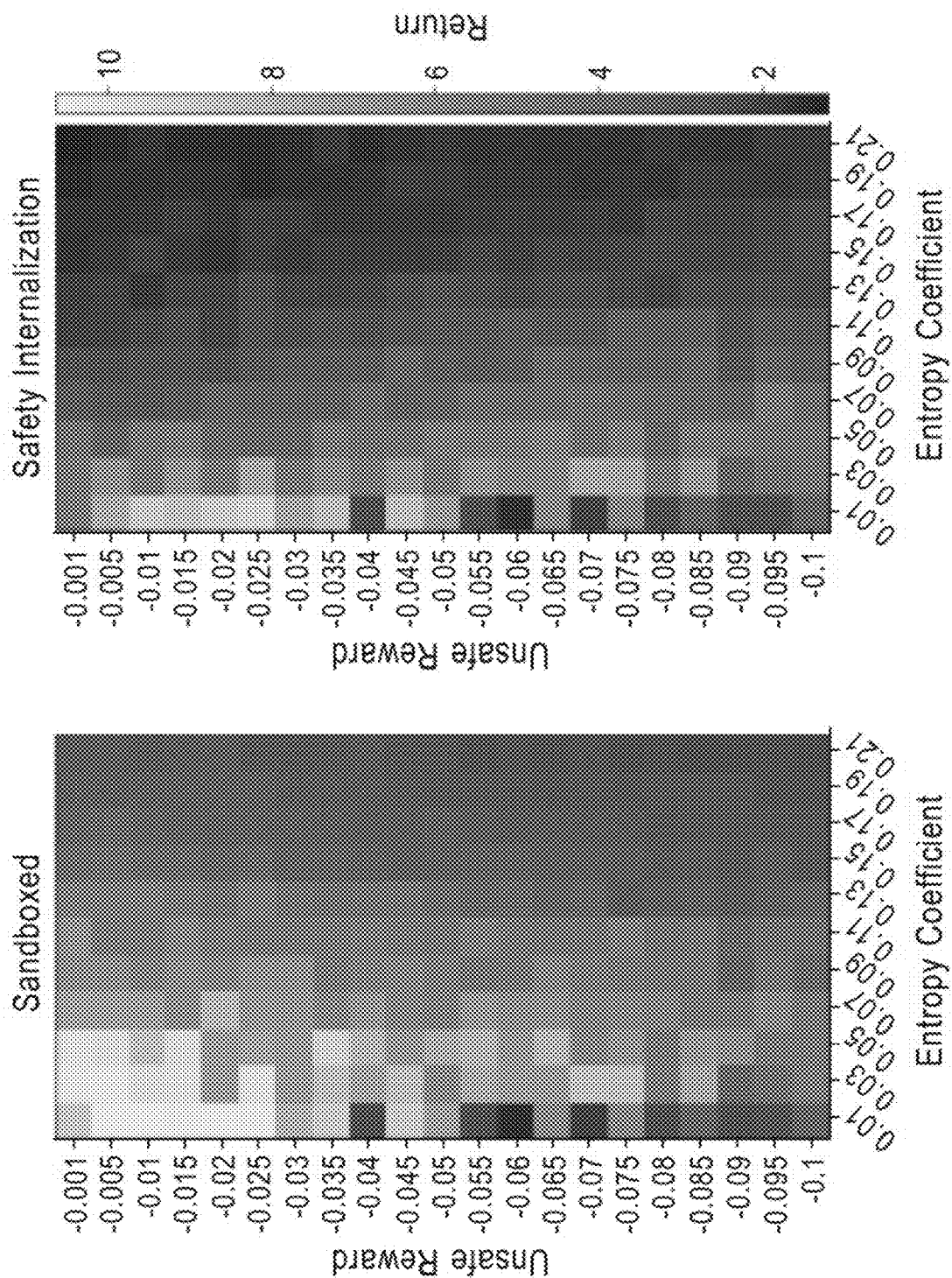
FIG. 3C illustrates safety generalization ability when penalizing unsafe action attempts in the XO environment, where penalization ("Unsafe Reward"≠0) degrades system performance, according to an embodiment of the disclosure.
Figure 3D:
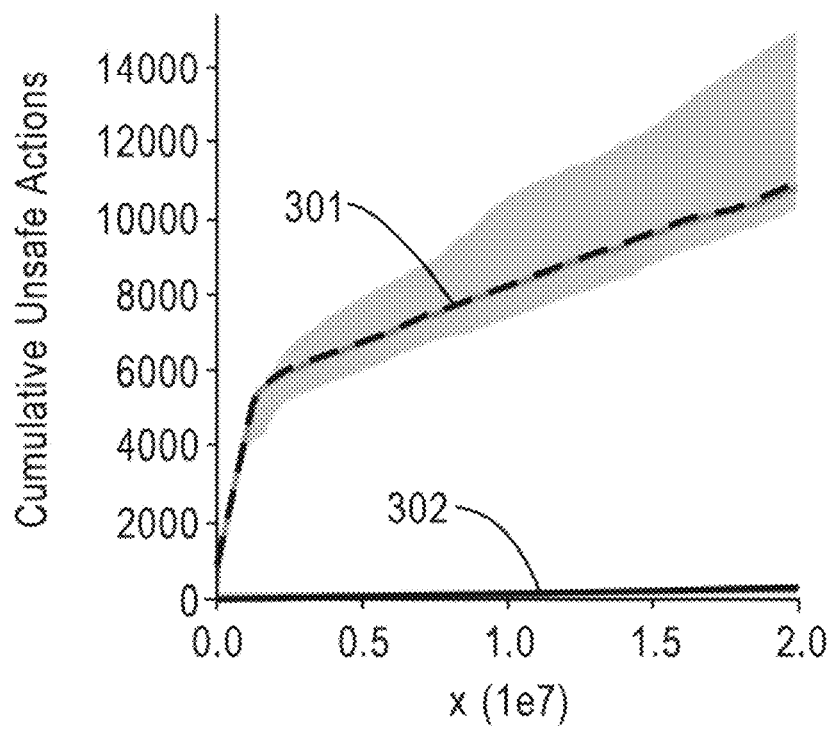
FIG. 3D compares a number of safety violations during training in the road runner environment, according to an embodiment of the disclosure.
Figure 3E:
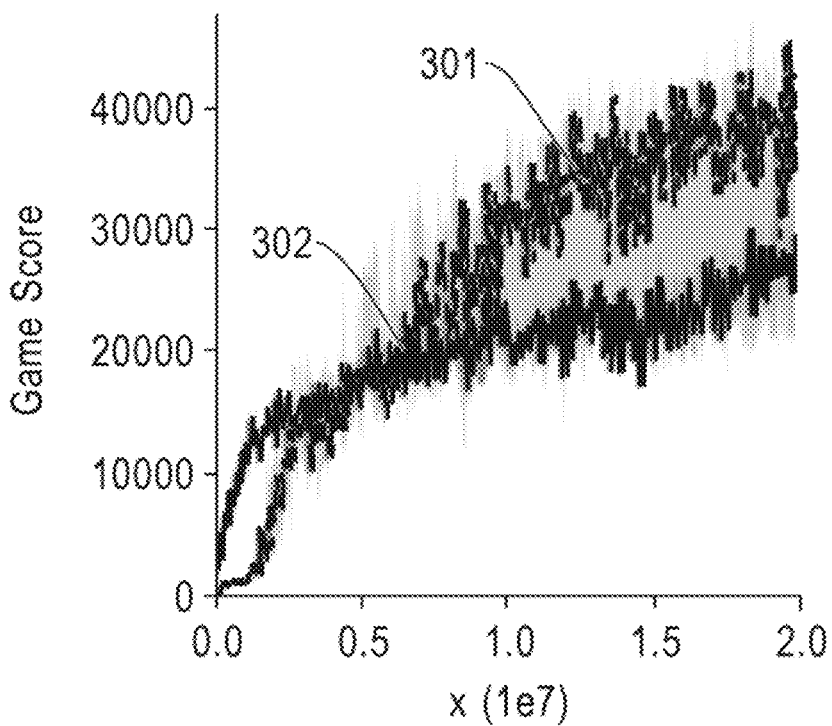
FIG. 3E illustrates cumulative reward during training in the road runner environment, according to an embodiment of the disclosure.

FIG. 3C compares a cumulative reward of a system according to an embodiment with and without the safety guard. Agents were trained with different amounts of penalty for attempting unsafe actions during training ("Unsafe Reward") and encouragement to explore ("Entropy Coefficient"). The final trained policy is significantly less safe when the safety monitor is removed, even when the agent is penalized for selecting unsafe actions during training; more penalization fails to cause greater internalization of safety constraints. Additionally, more than a tiny amount of penalization also degrades reward optimization.

Figure 3F:
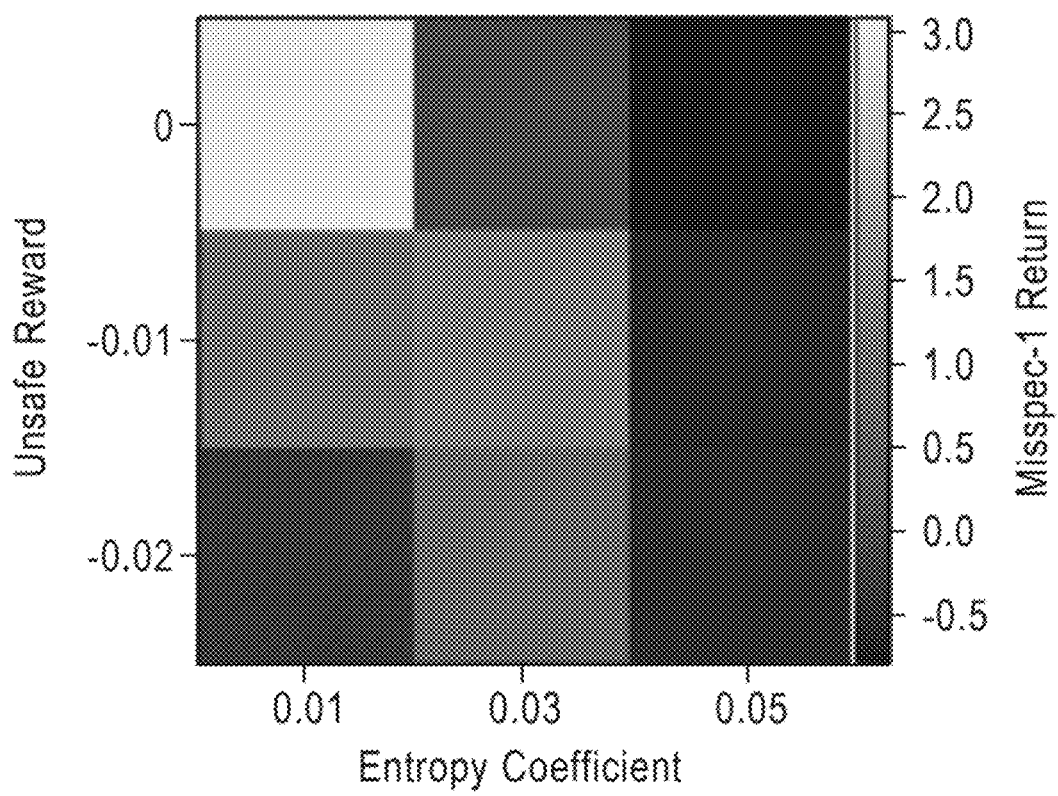
FIG. 3F illustrates the comparison of returns when an "Unsafe Reward" (penalty) is applied during training whenever an unsafe action is attempted, according to an embodiment of the disclosure.
Figure 3G:
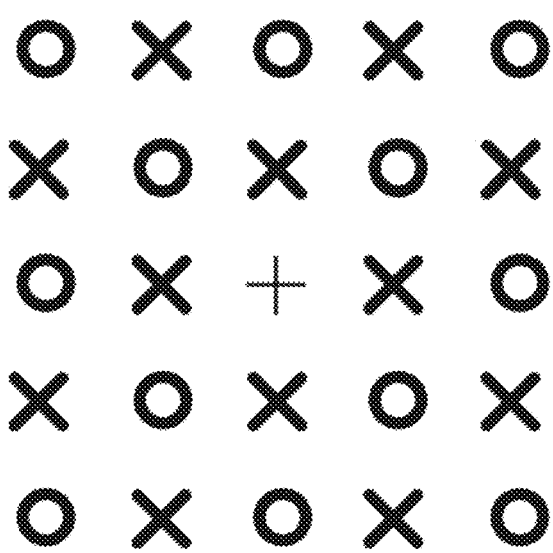
FIG. 3G illustrates an XO environment.

To test safety generalization, specification errors are introduced into the XO environment by modifying the Os to be larger at test time than specified, so that the safety constraints do not place a large enough radius around them. An unmodified algorithm according to an embodiment was tested on this mis-specified environment and the return was measured. FIG. 3F shows that not penalizing unsafe action attempts at all leads to the best safety generalization to the mis-specified test environment.

These observations suggest that penalizing unsafe action attempts is not an effective method for building policies that safely generalize beyond the original domain. In fact, doing so degrades performance both on the original task and on similar but novel tasks. Thus, another embodiment is proposed that, instead of attempting to generalize by internalizing the safety monitor's notion of risk, directly observes environmental transitions and inductively constructs safety constraints that are faithful to actually observed dynamics. FIG. 3B demonstrates that an approach according to another embodiment 303 works well in practice on the XO environment.

Optimization

Systems according to embodiments performed well in environments where it is possible to precisely specify the set of unsafe states. FIG. 3B plots the cumulative reward for a vanilla PPO, a system according to an embodiment 302 and a system according to another embodiment 303. The safety-constrained policy 303 converges to a better policy faster.

As with safety, the story is more complicated in the road runner environment. FIG. 3E plots cumulative reward for a system according to an embodiment 302 and a vanilla PPO 301. A system according to an embodiment 302 improves much faster than a PPO 301 at the beginning of training, but eventually a PPO 301 overtakes a system according to an embodiment 302 in game score. There are two underlying causes for a PPO outstripping the performance of a system according to an embodiment.

Some of the unconstrained agent's excess reward is attributable to the fact that the reward structure for the road runner game does not prioritize safety. For example, very near the end of level 1 a higher reward would be achieved by dying to collect birdseed than living to finish the level. The conservatism of a system according to an embodiment with respect to a reward that maximizes kamikaze strategies demonstrates the importance of safety as a stand-alone concern that is sometimes in contention with certain definitions of optimality, such as game score.

However, some of a PPO's excess reward is due to conservativeness in the safety guards. This conservatism was used both to cope with noise in the visual-to-symbolic mapping and because precisely modeling obstacle movement in road runner is deceptively challenging due to a coordinate transformation half way through the map. The conservativeness of the constraints pushes the roadrunner further away from the car, making it more challenging to get the car between the roadrunner and coyote, which is needed for rewarding the behavior of having the coyote be run over.

Summarily, a system according to an embodiment performs extremely well at reward maximization in simple environments where safety and reward maximization are aligned. Conversely, in environments where perception is noisy and reward structure is divorced from safety, a system according to an embodiment leaves some reward on the table. A system according to an embodiment misses this additional reward both because safety rules out suicidal reward maximization and because avoiding collisions due to misperception rules out the more dangerous reward maximization strategies.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
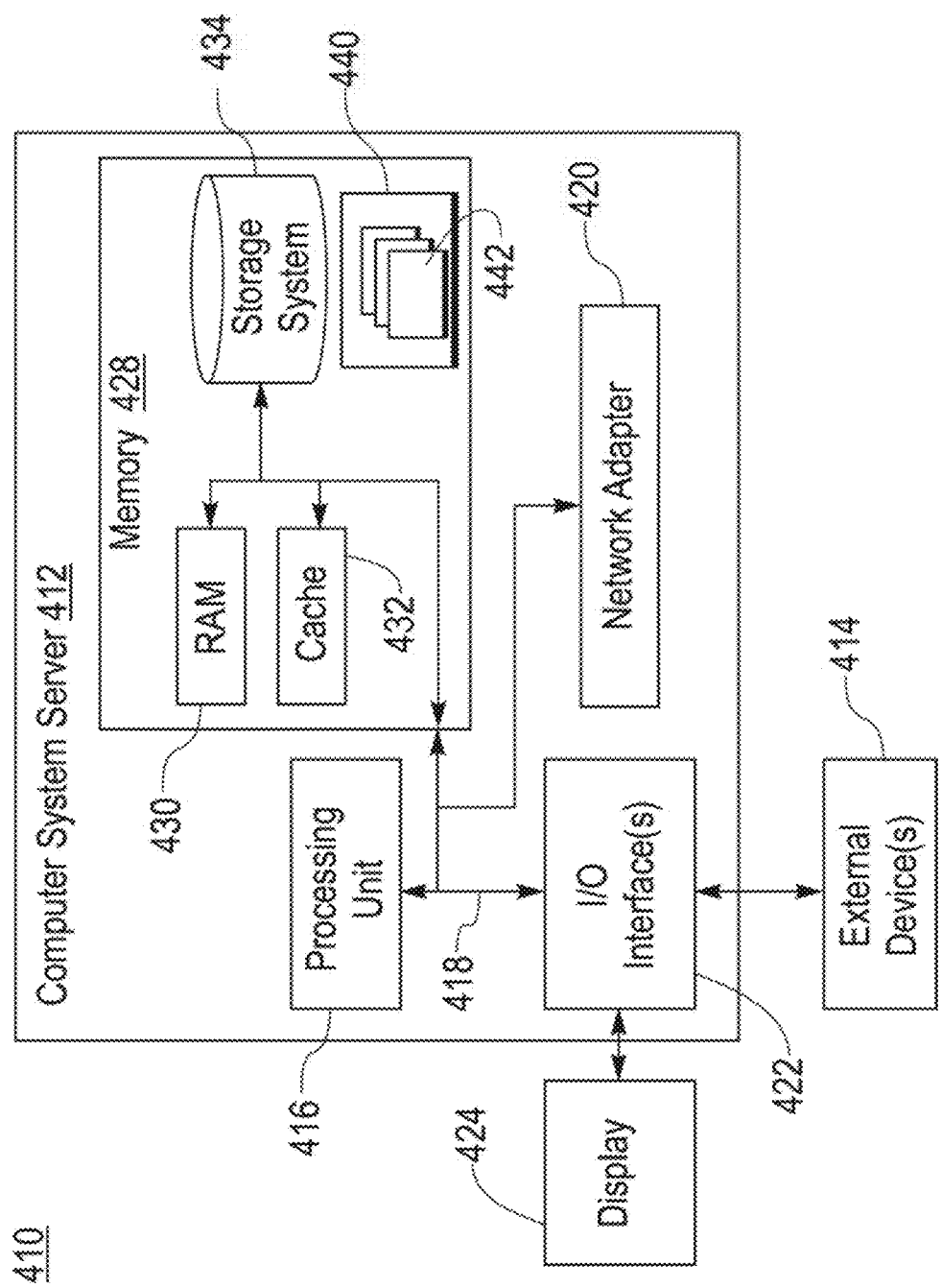
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
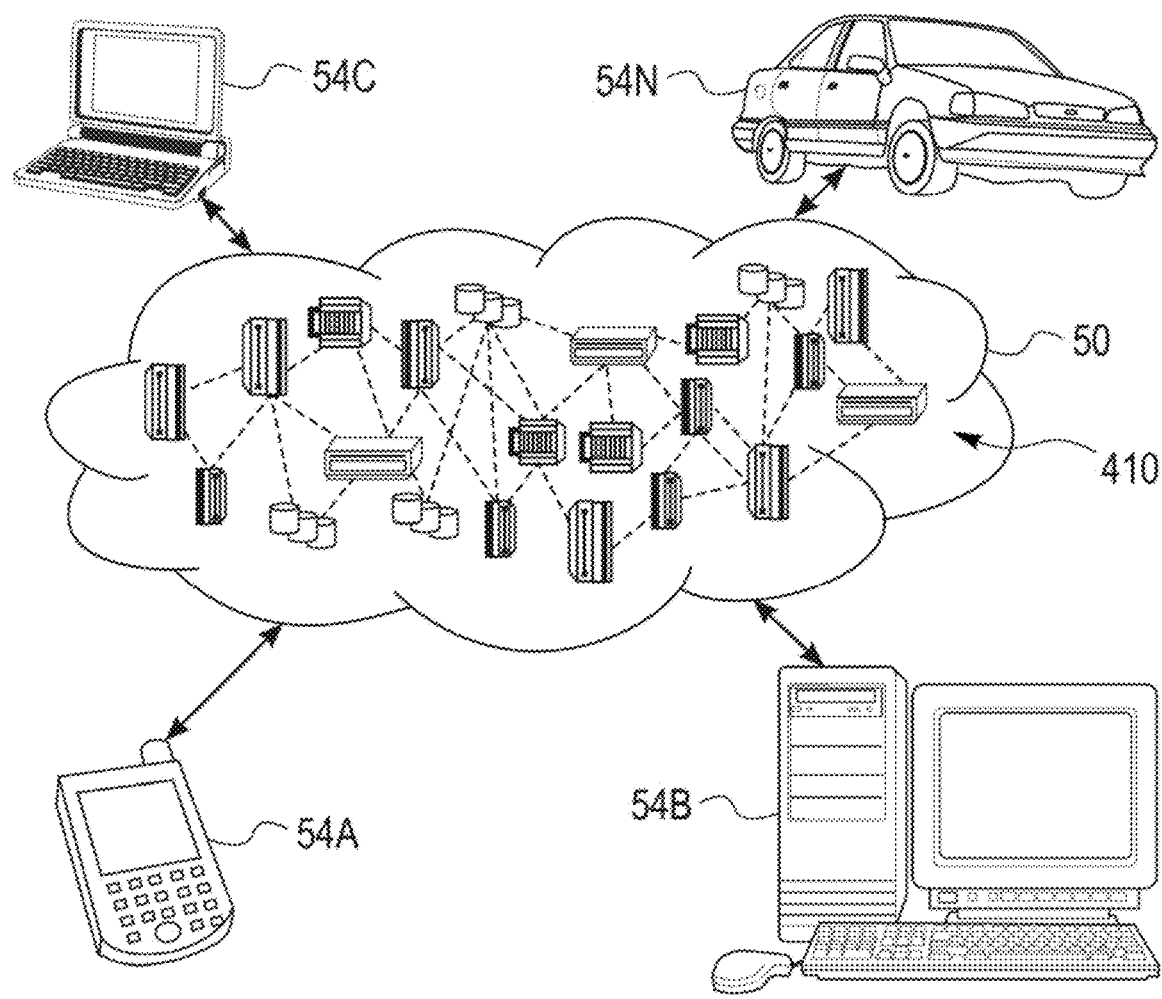
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 400 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for training control software to reinforce safety constraints using visual inputs, said method comprising the steps of:
performing template matching for each object in an image of a reinforcement learning (RL) agent's action space using a visual template for each object in the image wherein each object in the image of the RL agent's action space is detected;
mapping each detected object to a set of planar coordinates for each object in the image of the RL agent's action space,
determining a set of safe actions for the RL agent by applying a safety specification for the RL agent's action space to the set of variables for coordinates for each object in the image of the RL agent's action space;
outputting the set of safe actions to the RL agent for a current state of a RL procedure; and
preventing the RL agent from executing an action that is unsafe, before the RL agent takes an action.

2. The method of claim 1, wherein performing template matching for each object in the image of the RL agent's action space comprises
using the visual template for each object to place bounding boxes about each object in the image of the RL agent's action space.

3. The method of claim 2, wherein mapping each detected object to the set of planar coordinates for each object in the image of the RL agent's action space comprises
mapping a centroid of each bounding box to the planar coordinates for each object in the image of the RL agent's action space.

4. The method of claim 1, further comprising
training template matching for each object by augmenting data in a single, labeled image of the RL agent's action space,
removing all templates from the image,
randomly sampling a plurality of templates,
augmenting each of the plurality of templates,
randomly placing each of the plurality of templates in the image using template masks, wherein a plurality of images are created, and
training the template matching using the plurality of images.

5. The method of claim 4,
wherein augmenting data in the single, labeled image includes one or more of randomly adjusting the brightness of the image, cropping the image, or left-right flipping of the image, and
wherein augmenting each of the plurality of templates comprises one or more of left-right flipping of the template, rotating the template, or dropping pixels from the template.

6. The method of claim 1, wherein the RL agent is one of self-controlled land-based motor vehicle, a self-controlled aerial motor vehicle, a self-controlled floating aquatic motor vehicle, or a self-controlled underwater motor vehicle.

7. The method of claim 1, further comprising:
using differences between the set of planar coordinates for each object at a current RL step and the set of planar coordinates for each object at a previous RL step to infer potential actions of each object;
wherein the RL agent uses knowledge of its dynamics and the safety specification to construct constraints that ensure that the RL agent takes an action only if, after taking the action and then following a worst possible outcome of all previously observed state transitions, the safety specification is still satisfied one step into the future.

8. The method of claim 1, wherein the safety specification comprises a plurality of safety constraints specified in a formal logic for each object the image.

9. A method for training control software to reinforce safety constraints in a reinforcement learning (RL) algorithm that runs the control software, said method comprising the steps of:
forming visual templates of one or more safety-relevant objects in an input image from sample observations of each said safety-relevant object;
determining coordinates for each safety-relevant object from the visual template of each safety-relevant objects in the input image;
enforcing safety constraints for a RL agent in the RL algorithm by using the coordinates for each safety-relevant object; and
preventing the RL agent from executing an action that is unsafe, before the RL agent takes an action.

10. The method of claim 9, wherein determining coordinates for each safety-relevant object from the visual template of each safety-relevant objects in the input image comprises
placing bounding boxes each safety-relevant object by using the visual template for each object; and mapping a centroid of each bounding box to the coordinates for each safety-relevant object in the input image.

11. The method of claim 9, wherein enforcing safety constraints for the RL agent in the RL algorithm comprises
receiving a safety specification for the RL agent,
determining safety constraints from the safety specification and the coordinates for each safety-relevant object, wherein each action of the RL agent is labeled, as safe or unsafe, and
preventing the RL agent from executing an action that is unsafe.

12. The method of claim 9, wherein the RL agent is one of a self-controlled land-based motor vehicle, a self-controlled aerial motor vehicle, a self-controlled floating aquatic motor vehicle, or a self-controlled underwater motor vehicle.

13. A non-transitory program storage device readable by a computer, tangibly embodying a program of instructions executed by the computer to perform the method steps for training control software to reinforce safety constraints using visual inputs, said method comprising the steps of:
performing template matching for each object in an image of a reinforcement learning (RL) agent's action space using a visual template for each object in the image wherein each object in the image of the RL agent's action space is detected;
mapping each detected object to a set of planar coordinates for each object in the image of the RL agent's action space;
determining a set of safe actions for the RL agent by applying a safety specification for the RL agent's action space to the set of variables for coordinates for each object in the image of the RL agent's action space;
outputting the set of safe actions to the RL agent for a current state of a RL procedure, and
preventing the RL agent from executing, an action that is unsafe, before the RL agent takes an action.

14. The computer readable program storage device of claim 13, wherein performing template matching for each object in the image of the RL agent's action space comprises
using the visual template for each object to place bounding boxes about each object in the image of the RL agent's action space.

15. The computer readable program storage device of claim 14, wherein mapping each detected object to the set of planar coordinates for each object in the image of the RL agent's action space comprises
mapping a centroid of each bounding box to the planar coordinates for each object in the image of the RL agent's action space.

16. The computer readable program storage device of claim 13, the method further comprising
training template matching for each object by augmenting data in a single, labeler image of the RL agent's action space,
removing all templates from the image,
randomly sampling a plurality of templates,
augmenting each of the plurality of templates,
randomly placing each of the plurality of templates in the image using template masks, wherein a plurality of images are created, and
training the template matching, using the plurality of images.

17. The computer readable program storage device of claim 16,
wherein augmenting data in the single, labeled image includes one or more of randomly adjusting the brightness of the image, cropping the image, or left-right flipping of the image, and
wherein augmenting each of the plurality of templates comprises one or more of left-right flipping of the template, rotating the template, or dropping pixels from the template.

18. The computer readable program storage device of claim 13, wherein the RL agent is one of a self-controlled land-based motor vehicle, a self-controlled aerial motor vehicle, a self-controlled floating aquatic motor vehicle, or a self-controlled underwater motor vehicle.

19. The computer readable program storage device of claim 13, the method further comprising:
using differences between the set of planar coordinates for each object at a current RL step and the set of planar coordinates for each object at a previous RL step to infer potential actions of each object; wherein the RL agent uses knowledge of its dynamics and the safety, specification to construct constraints that ensure that the RL agent takes an action only if, after taking the action and then following a worst possible outcome of all previously observed state transitions, the safety specification is still satisfied one step into the future.

20. The computer readable program storage device of claim 13, wherein the safety specification comprises a plurality of safety constraints specified in a formal logic for each object in the image.

* * * * *